3,100,210
17α-ALKOXY-7α-ACETYLTHIOPROGESTERONES
Burton G. Christensen, Rahway, N.J., assignor to
Merck & Co., Inc., Rahway, N.J., a corporation of
New Jersey
No Drawing. Filed Nov. 18, 1960, Ser. No. 70,118
18 Claims. (Cl. 260—397.4)

This invention is concerned generally with novel steroids and processes of preparing the same. More particularly, it relates to novel 17α-alkoxy-7α-alkanoylthio-4-pregnene (and 1,4-pregnadiene)-3,20-diones and to closely related compounds, which steroids possess useful therapeutic properties as progestogens or as aldosterone inhibitors. This invention also relates to pharmaceutical compositions containing these novel steroid compounds.

The new products of my invention may be represented by the following structural formula:

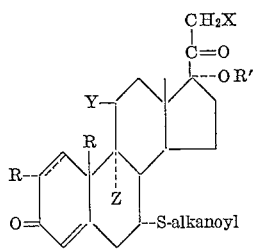

wherein the dotted line between carbon atoms 1 and 2 indicate that a double bond may be present in this position, and wherein R is hydrogen or methyl, R' stands for alkyl, X is hydrogen or halogen, Y stands for hydrogen, keto, or hydroxy and Z is hydrogen or halogen. The preferred alkanoyl radicals are formyl, acetyl, propionyl, butyryl, valeryl, hexanoyl, heptanoyl, octanoyl and branched-chain isomers thereof. The alkyl radicals which are preferred include methyl, ethyl, propyl, butyl, amyl and branched-chain isomers thereof.

In preparing my novel chemical compounds, the starting material utilized is a 17α-alkoxy-4-pregnene-3,20-dione which may be identified by the following structural formula:

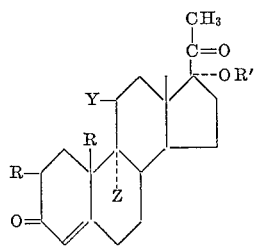

wherein R is hydrogen or methyl, R' stands for an alkyl, Y stands for hydrogen, keto or hydroxy, and Z is hydrogen or halogen.

The 17α-alkoxy-4-pregnene-3,20-dione may be reacted with chloranil to form the 17α-alkoxy-4,6-pregnadiene-3,20-dione which has the following formula:

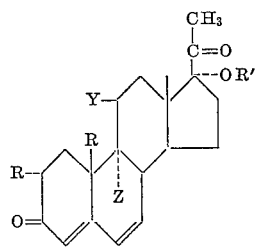

wherein R, R', Y and Z have the significance above defined.

The 17α-alkoxy-4,6-pregnadiene-3,20-dione is then converted into the 7α-alkanoylthio-17α-alkoxy-4-pregnene-3,20-dione which has the following structure:

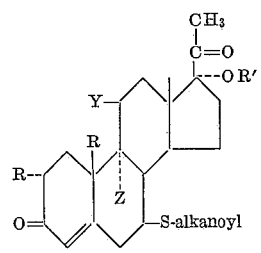

wherein R, R', Y and Z have the significance above defined, by the addition of a thioalkanoic acid of the structural formula R"COSH in which R" represents hydrogen or an alkyl radical. The addition reaction proceeds fairly rapidly at elevated temperatures, such as those in excess of 50° C. and can be carried out optionally under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100° C. Heating periods of up to a few hours are sufficient to achieve substantial conversion to the desired reaction products. Typically, the desired compound is obtained in a satisfactory state of purity by direct filtration of the cooled reaction mixture, preceded, where necessary, by removal of excess thioalkanoic acid. If desired, however, the reaction product can be purified by chromatography using adsorbents such as silica gel or acid-washed alumina, followed by elution with mixtures of ethyl acetate in benzene.

The addition of thioalkanoic acids to the 6,7-double bond of the starting materials employed in the practice of this invention proceeds under steric influences such that of the stereoisomers formed, one is obtained in predominant amount, which, in each case, has been characterized herein as possessing the α-configuration of the 7-acylthio-group. However, the designated configuration of the 7-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deductible from data presently available to workers in the field.

The 7α-alkanoylthio-17α-alkoxy-4-pregnene-3,20-dione may be dehydrogenated to the 7α-alkanoylthio-17α-alkoxy-1,4-pregnadiene-3,20-dione which has the following structure:

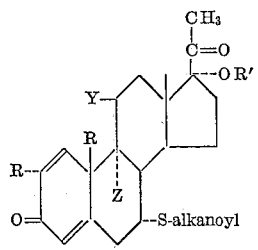

wherein R is hydrogen or methyl, R' stands for alkyl, Y stands for hydrogen, keto, or hydroxy, and Z is hydrogen or halogen.

The 7α-alkanoylthio-17α-alkoxy-4-pregnene-3,20-dione which has the following structure:

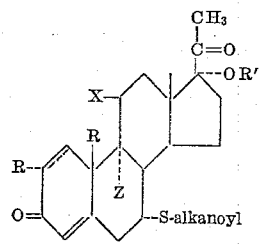

wherein the dotted line between carbon atoms 1 and 2 indicate that a double bond may be present in this position, and wherein R is hydrogen or methyl, R' stands for an alkyl, Y stands for hydrogen, keto or hydroxy, and Z is halogen or hydrogen, is reacted with iodine, for example, by treatment with iodine and finely powdered calcium oxide in a solvent such as tetrahydrofuran to form a 7α-alkanoylthio-17α-alkoxy-21-iodo-4-pregnene-3,20-dione of the formula:

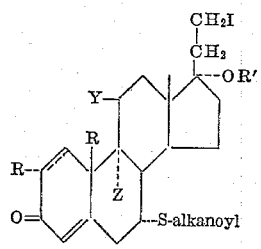

wherein R, R', Y and Z have the significance above defined.

The 7α-alkanoylthio-17α-alkoxy-21-iodo-4-pregnene-3,20-dione is reacted with a metal fluoride such as silver fluoride, to give the 7α-alkanoylthio-17α-alkoxy-21-fluoro-4-pregnene-3,20-dione of the formula:

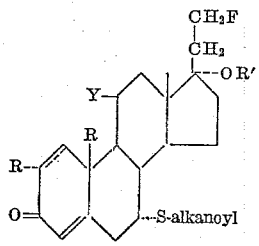

wherein R, R', Y and Z have the significance above defined.

The 7α-acetylthio-17α-methoxy-4-pregnene-3,20-dione is prepared by reaction of 17α-methoxy-4-pregnene-3,20-dione first with chloranil to form 17α-methoxy-4,6-pregnadiene-3,20-dione, and then heating the latter compound with thioacetic acid to form 7α-acetylthio-17α-methoxy-4-pregnene-3,20-dione. The 7α-propionylthio-17α-methoxy-4-pregnene-3,20-dione or 7α-(3-methylbutyrylthio)-17α-methoxy-4-pregnene-3,20-dione is obtained in analogous manner by heating 17α-methoxy-4,6-pregnadiene-3,20-dione with thiopropionic acid or 3-methyl-butanothiolic acid respectively.

The 7α-acetylthio-17α-methoxy-1,4-pregnadiene-3,20-dione is obtained by dehydrogenation of 7α-acetylthio-17α-methoxy-4-pregnene-3,20-dione with selenium dioxide.

The 7α-acetylthio-9α-fluoro-17α-methoxy-4-pregnene-11β-ol-3,20-dione is prepared by the following steps:

The 9α-bromo-17α-methoxy-4-pregnene-11β-ol-3,20-dione is refluxed with absolute alcohol and potassium acetate to obtain 17α-methoxy-4-pregnene-3,20-dione-9,11β-oxide which is then reacted with anhydrous HF in a solvent such as tetrahydrofuran. The latter compound is then treated with chloranil to give 9α-fluoro-17α-methoxy-4,6-pregnadiene-11β-ol-3,20-dione which on heating with thioacetic acid, forms 7α-acetylthio-9α-fluoro-17α-methoxy-4-pregnene-11β-ol-3,20-dione. The 7α-acetylthio-9α-fluoro-17α-methoxy-4-pregnene-11β-ol-3,20-dione may be converted into 7α-acetylthio-9α-fluoro-17α-methoxy-1,4-pregnadiene-11β-ol-3,20-dione by dehydrogenation with selenium dioxide.

The 7α-acetylthio-17α-methoxy-21-fluoro-4-pregnene-3,20-dione is obtained by reaction of 17α-methoxy-21-fluoro-4-pregnene-3,20-dione with chloranil to form 17α-methoxy-21-fluoro-4,6-pregnadiene-3,20-dione which is then reacted with thioacetic acid to give 7α-acetylthio-17α-methoxy-21-fluoro-4-pregnene-3,20-dione. The latter compound is converted to the 7α-acetylthio-17α-methoxy-21-fluoro-1,4-pregnadiene-3,20-dione by dehydrogenation with selenium dioxide.

The 2α-methyl-7α-acetylthio-17α-methoxy-4-pregnene-3,20-dione is prepared by the following steps:

The 17α-methoxy-4-pregnane-3,20-dione is reduced with sodium borohydride to give 17α-methoxy-4-pregnene-3,20-diol which is then reacted with activated manganese dioxide to give 17α-methoxy-4-pregnene-20-ol-3-one. The latter compound is treated with an alkyl oxalate and sodium alkoxide to form the sodium enolate of the 2-alkoxyoxalyl-derivative, which is then methylated with methyl iodide, followed by removal of the alkoxy-oxyoxalyl group, using a sodium alkoxide, to give 2α-methyl-17α-methoxy-4-pregnene-20-ol-3-one. The latter compound is oxidized with chromium trioxide in a non-aqueous base such as pyridine to give 2α-methyl-17α-methoxy-4-pregnene-3,20-dione. Reaction of 2α-methyl-17α-methoxy-4-pregnene-3,20-dione with chloranil gives 2α-methyl-17α-methoxy-4,6-pregnadiene-3,20-dione which on heating with thioacetic acid affords 2α-methyl-7α-acetylthio-17α-methoxy-4-pregnene-3,20-dione. The 2α-methyl-7α-acetylthio-17α-methoxy-4-pregnene-3,20-dione may be converted into 2-methyl-7α-acetylthio-17α-methoxy-1,4-pregnadiene-3,20-dione by dehydrogenation using selenium dioxide.

The 2α-methyl-7α-acetylthio-17α-methoxy-21-fluoro-4-pregnene-3,20-dione is prepared from 2α-methyl-7α-acetylthio-17α-methoxy-4-pregnene-3,20-dione by conversion first to the 2α-methyl-7α-acetylthio-17α-methoxy-21-iodo-4-pregnene-3,20-dione, for example, by treatment with iodine and finely powered calcium oxide in a solvent such as tetrahydrofuran, and then reacting the 2α-methyl-7α-acetylthio-17α-methoxy-21-iodo-4-pregnene-3,20-dione with silver fluoride. In like manner, the 2-methyl-7α-acetylthio-17α-methoxy-21-fluoro-1,4-pregnadiene-3,20-dione is prepared from 2α-methyl-7α-acetylthio-17α-methoxy-1,4-pregnadiene-3,20-dione by conversion first to 2-methyl-7α-acetylthio-17α-methoxy-21-iodo-1,4-pregnadiene-3,20-dione and treatment of the latter compound with silver fluoride.

The 2α-methyl-7α-acetylthio-9α-fluoro-17α-methoxy-4-pregnene-11β-ol-3,20-dione is prepared from 2α-methyl-17α-methoxy-4-pregnene-3,20-dione as starting material by the following steps:

2α-methyl-17α-methoxy-4-pregnene-3,20-dione is converted into a 2α-methyl-17α-methoxy-4-pregnene-11β-ol-3,20-dione by adrenal perfusion with oxygen. The 2α-methyl-17α-methoxy-4-pregnene-11β-ol-3,20-dione is dehydrated to form the 2α-methyl-17α-methoxy-4,9(11)-pregnadiene-3,20-dione, for example, with methane sulfonyl chloride in dimethyl formamide and pyridine. The 2α-methyl-17α-methoxy-4,9(11)-pregnadiene-3,20-dione is reacted with N-bromosuccinimide to afford 2α-methyl-9α-bromo-17α-methoxy-4-pregnene-11β-ol-3,20-dione which is converted to 2α-methyl-17α-methoxy-4-pregnene-3,20-dione-9,11β-oxide for example, by heating with potassium acetate in absolute alcohol. The 2α-methyl-17α-methoxy-4-pregnene-3,20-dione-9,11β-oxide is reacted with HF to give 2α-methyl-9α-fluoro-17α-methoxy-4-pregnene-11β-ol-3,20-dione. Treatment of 2α-methyl-9α-fluoro-17α-methoxy-4-pregnene-11β-ol-3,20-dione with chloranil gives 2α-methyl-9α-fluoro-17α-methoxy-4,6-pregnadiene-11β-ol- 3,20-dione which on heating with thioacetic acid forms 2α-methyl-7α-acetylthio-9α-fluoro-17α-methoxy-4-pregnene-11β-ol-3,20-dione. The 2α-methyl-7α-acetylthio-9α-fluoro-17α-methoxy-4-pregnene-11β-ol-3,20-dione may be converted into 2-methyl-7α-acetylthio-9α-fluoro-17α-methoxy-1,4-pregnadiene-11β-ol-3,20-dione by dehydrogenation using selenium dioxide.

The 2α-methyl-7α-acetylthio-9α,21-difluoro-17α-methoxy-4-pregnene-11β-ol-3,20-dione is prepared from 2α-methyl-7α-acetylthio-9α-fluoro-17α-methoxy-4-pregnene-11β-ol-3,20-dione by conversion first to the 2α-methyl-7α-acetylthio-9α-fluoro-21-iodo-17α-methoxy-4-pregnene-11β-ol-3,20-dione, for example, by treatment with iodine and finely powdered calcium oxide in a solvent such as tetrahydrofuran, and then reacting 2α-methyl-7α-acetylthio-9α-fluoro-21-iodo-17α-methoxy-4-pregnene-11β-ol-3,20-dione with silver fluoride. In like manner, 2-methyl-7α-acetylthio-9α,21-difluoro-17α-methoxy-1,4-pregnadiene-11β-ol-3,11,20-trione is prepared from 2-methyl-7α-acetylthio-9α-fluoro-17α-methoxy-1,4-pregnadiene-11β-ol-3,11,20-trione by conversion first to 2-methyl-7α-acetylthio-9α-fluoro-21-iodo-17α-methoxy-1,4-pregnadiene-11β-ol-3,20-dione and treating the latter compound with silver fluoride.

The 7α-acetylthio-17α-methoxy-19-nor-4-pregnene-3,20-dione is prepared by reaction of 17α-methoxy-19-nor-4-pregnene-3,20-dione with chloranil to form 17α-methoxy-19-nor-4,6-pregnadiene-3,20-dione, and then reacting the latter compound with thioacetic acid to form 7α-acetylthio-17α-methoxy-19-nor-4-pregnene-3,20-dione.

The 7α-acetylthio-17α-methoxy-21-fluoro-19-nor-4-pregnene-3,20-dione is prepared from 7α-acetylthio-17α-methoxy-19-nor-4-pregnene-3,20-dione by conversion first to the 7α-acetylthio-17α-methoxy-21-iodo-19-nor-4-pregnene-3,20-dione, for example, by treatment with iodine and finely powdered calcium oxide in a solvent such as tetrahydrofuran and then reacting 7α-acetylthio-17α-methoxy-21-iodo-19-nor-4-pregnene-3,20-dione with silver fluoride.

The 11β-hydroxy-steroids, namely the 7α-acetylthio-9α-fluoro-17α-methoxy-4-pregnene-11β-ol-3,20-dione, 7α-acetylthio-9α-fluoro-17α-methoxy-1,4-pregnadiene-11β-ol-3,20-dione, 2α-methyl-7α-acetylthio-9α-fluoro-17α-methoxy-4-pregnene-11β-ol-3,20-dione and 2-methyl-7α-acetylthio-9α-fluoro-17α-methoxy-1,4-pregnadiene-11β-ol-3,20-dione are converted into the corresponding 11-keto-derivatives, namely the 7α-acetylthio-9α-fluoro-17α-methoxy-4-pregnene-3,11,20-trione, 7α-acetylthio-9α-fluoro-17α-methoxy-1,4-pregnadiene-3,11,20-trione, 2α-methyl-7α-acetylthio-9α-fluoro-17α-methoxy-4-pregnene-3,11,20-trione and 2-methyl-7α-acethylthio-9α-fluoro-17α-methoxy-1,4-pregnadiene-3,11,20-trione, on oxidation, for example, with chromium trioxide in a nonaqueous organic base such as pyridine.

These novel 7α-alkanoylthio-17α-alkoxy-4-pregnene (and 1,4-pregnadiene)-3,30-dione compounds possess progestational activity. Certain of these compounds block the salt-retaining effects of aldosterone so as to be useful as aldosterone antagonists in the treatment of diseases such as congestive heart failure, in which aldosterone secretion is increased.

A further embodiment of our invention comprises novel pharmaceutical compositions containing these 17α-alkoxy-7α-alkanoylthio-4-pregnene (and 1,4-pregnadiene)-3,20-diones. A preferred embodiment of my invention comprises pharmaceutical compositions containing these 17α-alkoxy-7α-alkanoylthio-4-pregnene-3,20-diones combined with diuretics such as chlorothiazide, hydrochlorothiazide and related compounds.

The following examples illustrate methods of carrying out the present invention but it is to be understood that these examples are given for purposes of illustration and not of limitation.

*Example 1*

A suspension of 17α-methoxy-4-pregnene-3,20-dione (11.1 g.) and chloranil (24.3 g.) in 360 ml. of dry t-butanol is heated under reflux for three hours, protected by a blanket of nitrogen. The solvent is removed and the residue of the solvent is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-4,6-pregnadiene-3,20-dione, M.P. 165–8° C., $\lambda_{max}$ 282.5 mµ; ε percent 766;

I.R.$_{max.}^{Nujol}$ 5.90, 5.99, 6.11, 6.28µ

The 17α-methoxy-4-pregnene-3,20-dione used as the starting material can be prepared as follows:

A mixture of 100 mg. of 4-pregnene-17α-ol-3,20-dione, 5.0 ml. of methyl iodide and 300 mg. of silver oxide prepared, for example, by precipitation of a warm aqueous solution of silver nitrate with approximately one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina. The eluate from the chromatograph column having a solvent composition of ether: petroleum ether (3:7) to (1:9) contains the desired 17α-methoxy-4-pregnene-3,20-dione. The product is recovered and purified by evaporation of the solvent from the eluate fraction and recrystallization of the residue. The purified 17α-methoxy-4-pregnene-3,20-dione melts at 209–211° C.

$\lambda_{max.}^{MeOH}$ 241 mm., E 16,400; $\lambda_{max.}^{Nujol}$ 5.87, 5.98, 6.20µ

Nuclear magnetic resonance data is consistent with the assigned structure, showing a CH₃O grouping at 130.5 cycles on the high field side of benzene.

*Example 2*

A solution of 80 mg. of 17α-methoxy-4,6-pregnadiene-3,20-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-17α-methoxy-4-pregnene-3,20-dione, M.P. 172.5–174° C.

*Example 3*

To 100 mg. of 7α-acetylthio-17α-methoxy-4-pregnene-3,20-dione (0.50 g.) in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 7α-acetylthio-17α-methoxy-1,4-pregnadiene-3,20-dione.

*Example 4*

A solution of 210 mg. of 9α-bromo-17α-methoxy-4-pregnene-11β-ol-3,20-dione and 240 mg. of potassium acetate in 10 ml. of absolute ethanol is heated under reflux for two hours. The reaction mixture is cooled to room temperature and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from a mixture of ethyl acetate to give 17α-methoxy-4-pregnene-3,20-dione-9,11β-oxide.

The 9α-bromo-17α-methoxy-4-pregnene-11β-ol-3,20-dione used as the starting material can be prepared as follows: A mixture is prepared of 50 mg. of 9α-bromo-4-pregnene-11β,17α-diol-3,20-dione, 2.5 ml. of methyl iodide and 150 mg. of silver oxide prepared for example, by precipitation of a warm aqueous solution of silver nitrate with approximately one mole of an aqueous solution of pure sodium hydroxide. The reaction mixture is stirred at the reflux temperature for approximately 72 hours. The entire mixture is filtered to remove the formed inorganic precipitate comprising silver iodide and the precipitate is washed with chloroform to remove any steroid product. The filtrate and washings containing the product are combined and evaporated under reduced pressure to give a crude residue comprising 9α-bromo-17α-methoxy-4-pregnene-11β-ol-3,20-dione which is purified by chromatography on acid-washed alumina and recrystallization from a mixture of methylene chloride and ether.

Example 5

To a solution of 200 mg. of 17α-methoxy-4-pregnene-3,20-dione-9,11β-oxide in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from a mixture of acetone and ether gives 9α-fluoro-17α-methoxy-4-pregnene-11β-ol-3,20-dione.

Example 6

A suspension of 9α-fluoro-17α-methoxy-4-pregnene-11β-ol-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 9α-fluoro-17α-methoxy-4,6-pregnadiene-11β-ol-3,20-dione.

Example 7

A solution of 80 mg. of 9α-fluoro-17α-methoxy-4,6-pregnadiene-11β-ol-3,20-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-9α-fluoro-17α methoxy-4-pregnene-11β-ol-3,20-dione.

Example 8

To 100 mg. of 7α-acetylthio-9α-fluoro-17α-methoxy-4-pregnene-11β-ol-3,20-dione in 5 ml. of t-butanol and 0.1 ml. of acetic acid is aded 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 7α-acetylthio-9α-fluoro-17α-methoxy-1,4-pregnadiene-11β-ol-3,20-dione.

Example 9

A suspension of 17α-methoxy-21-fluoro-4-pregnene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-21-fluoro-4,6-pregnadiene-3,20-dione.

The 21-fluoro-17α-methoxy-4-pregnene-3,20-dione used as the starting material can be prepared as follows:

A mixture is prepared of 21-fluoro-17α-hydroxy-4-pregnene-3,20-dione, 5 ml. of methyl iodide and 300 mg. of silver oxide prepared, for example, by precipitation of a warm aqueous solution of silver nitrate with approximately one mole of an aqueous solution of pure sodium hydroxide. The mixture is stirred at the reflux temperature for approximately 72 hours. The inorganic precipitate containing silver iodide which formed during the course of the reaction is filtered off and washed with chloroform to recover any occluded product. The filtrate and washings are combined and evaporated under reduced pressure to give a crude residue of product comprising 21-fluoro-17α-methoxy-4-pregnene-3,20-dione. The crude residue of product is dissolved in benzene, chromatographed on acid-washed alumina and recrystallized from a mixture of methylene chloride and ether to give essentially pure 21-fluoro-17α-methoxy-4-pregnene-3,20-dione.

Example 10

A solution of 80 mg. of 17α-methoxy-21-fluoro-4,6-pregnadiene-3,20-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-17α-methoxy-21-fluoro-4-pregnene-3,20-dione.

Example 11

To 100 mg. of 7α-acetylthio-17α-methoxy-21-fluoro-4-pregnene-3,20-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated. The residue is extracted with ethyl acetate and the extract is washed successively with aqueous bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 7α-acetylthio-17α-methoxy-21-fluoro-1,4-pregnadiene-3,20-dione.

Example 12

To a stirred solution of 600 mg. of the 17α-methoxy-4-pregnene-3,20-dione in 30 ml. of tetrahydrofuran and 11 ml. of water under nitrogen is added 400 mg. powdered sodium borohydride. The stirred suspension is refluxed 45 minutes and then cooled to 15° C. Aqueous acetic acid (3 ml. of 30%) is added cautiously and most of the tetrahydrofuran is removed in vacuo. Addition of 5 ml. of methanol and 5 ml. of water induces the product to crystallize. Following addition of 10 ml. of a saturated sodium chloride solution and aging at 0° C. the product is filtered, washed with water, and dried in air to give 17α-methoxy-4-pregnene-3,20-diol.

Example 13

Two gms. of manganese dioxide activated by precipitation in the presence of alkali, or by treating with alkali after precipitation and before drying, is slurried in 30 ml.

of 15% nitric acid for 40 minutes, filtered and washed until neutral. The activated manganese dioxide is dried at 100° C. for 20 minutes and stirred together with 200 mg. of 17α-methoxy-4-pregnene-3,20-diol and 30 ml. of acetone for 1½ hours. The reaction mixture is then filtered and the filtrate is concentrated in vacuo. The residue is crystallized from a mixture of acetone and hexane to give 17α-methoxy-4-pregnene-20-ol-3-one.

*Example 14*

To 8.0 g. of 17α-methoxy-4-pregnene-3,20-diol suspended in 100 ml. of t-butyl alcohol is added 3.2 g. of commercial (95%) sodium methylate. To this mixture under nitrogen is added 5 ml. of diethyl oxalate and the mixture is then stirred under nitrogen for 6 hours. Complete solution occurs and the product precipitates within 10 minutes. Addition of ether followed by filtration gives 13 g. of the sodium enolate, which is a powder, soluble in water but insoluble in dilute acid.

A mixture of the crude sodium enolate, 13 g. of anhydrous potassium carbonate, 300 ml. of acetone and 50 ml. of methyl iodide is refluxed for 20 hours, filtered while hot and the filtrate concentrated to a small volume. A large amount of water is added to the concentrate which is then extracted with ethyl acetate. The extract is washed with saturated sodium chloride solution, dried and treated with activated carbon. After evaporation 7.8 g. of a pale yellow residue is obtained.

To this residue, dissolved in 250 ml. of absolute alcohol, is added 1.0 g. of 95% sodium methylate. The mixture is then allowed to stand at room temperature for 4 hours. After the addition of a few drops of acetic acid and 20 ml. of water, the methanol is removed under reduced pressure at a temperature not exceeding 35° C. The ethyl acetate extract of the mixture is washed to neutrality with a saline solution, dried, and decolorized with activated carbon. Evaporation leaves 5.7 g. of the crude 2α-methyl-17α-methoxy-4-pregnene-20-ol-3-one.

*Example 15*

A solution of 400 mg. of 2α-methyl-17α-methoxy-4-pregnene-20-ol-3-one in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate-ether to give 2α-methyl-17α-methoxy-4-pregnene-3,20-dione.

*Example 16*

The perfusion medium is prepared by mixing 7 volumes of citrated whole beef blood with 5 volumes of "modified" (calcium chloride omitted) Tyrode Solution and subjecting the resultant mixture to the action of a stream of oxygen during a 2.5 hour period. A solution of 1 g. of 2α-methyl-17α-methoxy-4-pregnene-3,20-dione in 40 ml. of propylene glycol is added to 250 ml. of this medium and the mixture is then perfused at 36–37.5° C. through 8 beef adrenals (av. wt. 17.9 g. each) prepared according to the technique of Hechter and co-workers (O. Hechter, R. P. Jacobsen, V. Schenker, H. Levy, R. W. Jeanloz, C. W. Marshall, and G. Pincus, Endocrinology, 52, 679 (1953). During the course of perfusion, oxygen is continuously bubbled through the medium. After approximately 3 hours, in the course of which 6 passes of the medium through the glands are completed, perfusion is stopped, and the perfusate is extracted three times with isopropyl acetate. Solvent is removed from the combined extracts by evaporation under reduced pressure, and the residue is crystallized to give 2α-methyl-17α-methoxy-4-pregnene-11β-ol-3,20-dione.

*Example 17*

To bring about the dehydration a solution of 400 mg. of 2α-methyl-17α-methoxy-4-pregnene-11β-ol-3,20-dione in 2.0 ml. dimethyl formamide, 0.8 ml. of pyridine and 0.4 ml. of methanesulfonyl chloride is kept at 75° C. for one hour. The mixture is cooled and water is added. The precipitate formed is filtered, washed with water and dried in air. The desired 2α-methyl-17α-methoxy-4,9-(11)-pregnadiene-3,20-dione is purified by chromatography on 20 g. of alumina and eluted with benzene. Crystallization of the material eluted by benzene gives pure 2α-methyl-17α-methoxy-4,9(11)-pregnadiene-3,20-dione.

*Example 18*

To a mixture of 620 mg. of 2α-methyl-17α-methoxy-4,9(11)-pregnadiene-3,20-dione and 330 mg. of N-bromosuccinimide in 10 ml. of dioxane, and 3.2 ml. of water cooled to 10° C. is added 1.8 ml. of cold 1M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and the product is filtered, washed with water, and dried in air to give 2α-methyl-9α-bromo-17α-methoxy-4-pregnene-11β-ol-3,20-dione.

*Example 19*

A solution of 210 mg. of 2α-methyl-9α-bromo-17α-methoxy-4-pregnene-11β-ol-3,20-dione and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, and evaporated to dryness in vacuo. The residual material is crystallized from a mixture of ethyl acetate and ether to give 2α-methyl-17α-methoxy-4-pregnene-3,20-dione-9,11β-oxide.

*Example 20*

To a solution of 200 mg. of 2α-methyl-17α-methoxy-4-pregnene-3,20-dione-9,11β-oxide in 2 ml. of chloroform and 2 ml. of tetrahydrofuran in a polyethylene bottle at −60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase is washed with water and dried over magnesium sulfate. The residue on crystallization from a mixture of acetone and ether gives 2α-methyl-9α-fluoro-17α-methoxy-4-pregnene-11β-ol-3,20-dione.

*Example 21*

A suspension of 2α-methyl-9α-fluoro-17α-methoxy-4-pregnene-11β-ol-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 2α-methyl-9α-fluoro-17α-methoxy-4,6-pregnadiene-11β-ol-3,20-dione.

*Example 22*

A solution of 80 mg. of 2α-methyl-9α-fluoro-17α-methoxy-4,6-pregnadiene-11β-ol-3,20-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 2α-methyl-7α-acetylthio-9α-fluoro-17α-methoxy-4-pregnene-11β-ol-3,20-dione.

*Example 23*

To 100 mg. of 2α-methyl-7α-acetylthio-9α-fluoro-17α-methoxy-4-pregnene-11β-ol-3,20-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 2-methyl-7α-acetylthio - 9α - fluoro - 17α - methoxy - 1,4-pregnadiene-11β-ol-3,20-dione.

*Example 24*

To a solution of 2α-methyl-7α-acetylthio-9α-fluoro-17α-methoxy-4-pregnene-11β-ol-3,20-dione (160 mg.) in a mixture of tetrahydrofuran (1.2 cc.) and methanol (0.7 cc.) is added iodine (240 mg.) and finely powdered calcium oxide (240 mg.). After stirring at room temperature for 3 hours, at which time the iodine color is discharged, the mixture is poured onto cold water (25 cc.) containing acetic acid (1.0 cc.). The product is then extracted with methylene dichloride. The extract is washed with water, dried with sodium sulfate and evaporated to dryness, to give the 21-iodo derivative. The latter compound, dissolved in moist acetonitrile, is treated with a slight excess of a 50% aqueous solution of silver fluoride at 30 to 40° C. for about 16 hours. A precipitate of silver iodide separates, leaving 2α-methyl-7α-acetylthio-9α,21-difluoro-17α - methoxy - 4 - pregnene - 11β - ol - 3,20-dione in solution. After filtration from the silver iodide, the reaction mixture is diluted with water and extracted with chloroform. The chloroform extract is evaporated and the residue chromatographed over acid-washed alumina. Elution with mixtures of ether and chloroform separates 2α-methyl-7α-acetylthio-9α,21-difluoro-17α-methoxy-4-pregnene-11β-ol-3,20-dione in substantially pure form.

To a solution of 2-methyl-7α-acetylthio-9α-fluoro-17α-methoxy-1,4-pregnadiene-11β-ol-3,20-dione (160 mg.) in a mixture of tetrahydrofuran (1.2 cc.) and methanol (0.7 cc.) is added iodine (240 mg.) and finely powdered calcium oxide (240 mg.). After stirring at room temperature for 3 hours, at which time the iodine color is discharged, the mixture is poured onto cold water (25 cc.) containing acetic acid (1.0 cc.). The product is then extracted with methylene dichloride. The extract is washed with water, dried with sodium sulfate and evaporated to dryness, to give the 21-iodo derivative. The latter compound, dissolved in moist acetonitrile, is treated with a slight excess of a 50% aqueous solution of silver fluoride at 30 to 40° C. for about 16 hours. A precipitate of silver iodide separates, leaving 2α-methyl-7α-acetylthio-9α,21 - difluoro-17α-methoxy-1,4-pregnadiene-11β-ol-3,20-dione in solution. After filtration from the silver iodide, the reaction mixture is diluted with water and extracted with chloroform. The chloroform extract is evaporated and the residue chromatographed over acid-washed alumina. Elution with mixtures of ether and chloroform separates 2-methyl-7α-acetylthio-9α,21-difluoro-17α-methoxy-1,4 - pregnadiene - 11β-ol-3,20-dione in substantially pure form.

*Example 25*

A suspension of 2α-methyl-17α-methoxy-4-pregnene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 2α-methyl-17α-methoxy-4,6-pregnadiene-3,20-dione.

*Example 26*

A solution of 80 mg. of 2α-methyl-17α-methoxy-4,6-pregnadiene-3,20-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 2α - methyl - 7α - acetylthio-17α-methoxy-4-pregnene-3,20-dione.

*Example 27*

To 100 mg. of 2α-methyl-7α-acetylthio-17α-methoxy-4-pregnene-3,20-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed an additional 24 hours. The product is filtered, and the filtrate evaporated. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 2-methyl-7α-acetylthio-17α-methoxy-1,4-pregnadiene-3,20-dione.

*Example 28*

To a solution of 2α-methyl-7α-acetylthio-17α-methoxy-4-pregnene-3,20-dione (160 mg.) in a mixture of tetrahydrofuran (1.2 cc.) and methanol (0.7 cc.) is added iodine (240 mg.) and finely powdered calcium oxide (240 mg.). After stirring at room temperature for 3 hours, at which time the iodine color is discharged, the mixture is poured onto cold water (25 cc.) containing acetic acid (1.0 cc.). The product is then extracted with methylene dichloride. The extract is washed with water, dried with sodium sulfate and evaporated to dryness, to give the 21-iodo derivative. The latter compound, dissolved in moist acetonitrile, is treated with a slight excess of a 50% aqueous solution of silver fluoride at 30–40° C. for about 16 hours. A precipitate of silver iodide separates, leaving 2α-methyl-7α-acetylthio - 17α - methoxy-21-fluoro-4-pregnene-3,20-dione in solution.

After filtration from the silver iodide, the reaction mixture is diluted with water and extracted with chloroform. The chloroform extract is evaporated and the residue chromatographed over acid-washed alumina. Elution with mixtures of ether and chloroform separates 2α-methyl-7α-acetylthio-17α-methoxy - 21 - fluoro-4-pregnene-3,20-dione in substantially pure form.

To a solution of 2-methyl-7α-acetylthio-17α-methoxy-1,4-pregnadiene-3,20-dione (160 mg.) in a mixture of tetrahydrofuran (1.2 cc.) and methanol (0.7 cc.) is added iodine (240 mg.) and finely powered calcium oxide (240 mg.). After stirring at room temperature for 3 hours, at which time the iodine color is discharged, the mixture is poured onto cold water (25 cc.) containing acetic acid (1.0 cc.). The product is then extracted with methylene dichloride. The extract is washed with water, dried with sodium sulfate and evaporated to dryness, to give the 21-iodo derivative. The latter compound, dissolved in moist acetonitrile, is treated with a slight excess of a 50% aqueous solution of silver fluoride at 30 to 40° C. for about 16 hours. A precipitate of silver iodide separates, leaving 2 - methyl-7α-acetylthio-17α-methoxy-21-fluoro-1,4-pregnadiene-3,20-dione in solution. After filtration from the silver iodide, the reaction mixture is diluted with water and extracted with chloroform. The chloroform extract is evaporated and the residue chromatographed over acid-washed alumina. Elution with mixtures of ether and chloroform separates 2-methyl-7α-acetylthio-17α-methoxy-21-fluoro - 1,4 - pregnadiene-3,20-dione in substantially pure form.

Example 29

A mixture of 1.5 parts by weight of 17α-methoxy-4-pregnene-3,20-dione and 1.5 parts by volume of thiopropionic acid is heated on the steam bath for 3 hours. After standing overnight, the reaction mixture is diluted with 25 parts by volume of ether and the crystals which form on cooling are separated and recrystallized from ether and petroleum ether to give 7α-propionylthio-17α-methoxy-4-pregnene-3,20-dione.

Example 30

A mixture of 1 part by weight of 17α-methoxy-4,6-pregnadiene-3,20-dione and 1 part by volume of 3-methylbutanethiolic acid is heated for 20 minutes on the steam bath. Then the excess thiolic acid is removed in vacuo, the residue dissolved in 100 parts by volume of benzene and chromatographed on silica gel. The column is washed successively with 6000 parts by volume portions of benzene, 5% ethyl acetate in benzene, 10% ethyl acetate in benzene, and 25% ethyl acetate in benzene and the product is eluted with 8000 parts by volume of 40% ethyl acetate in benzene. The solvents are removed from the eluate to yield 7α-(3-methylbutyrylthio)-17α-methoxy-4-pregnene-3,20-dione.

Example 31

A suspension of 17α-methoxy-4,6-pregnadiene-3,20-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-19-nor-4,6-pregnadiene-3,20-dione. The 17α - methoxy-19-nor-4-pregnene-3,20-dione used as the starting material can be prepared as follows:

A mixture of 100 mg. of 17α-hydroxy-19-nor-4-pregnene-3,20-dione, 5.0 ml. of methyl iodide and 300 mg. of silver oxide prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina. The eluate from the chromatograph column having a solvent composition of ether:petroleum ether (3:7) to (1:9) contains the desired 17α-methoxy-19-nor-4-pregnene-3,20-dione. The product is recovered and purified by evaporation of the solvent from the eluate fraction and recrystallization of the residue. The purified 17α-methoxy-19-nor-4-pregnene-3,20-dione melts at 209–211° C.

$\lambda_{max.}^{MeOH}$ 241 mμ, E 16,400; $\lambda_{max.}^{Nujol}$ 5.87, 5.98, 6.20μ

Nuclear magnetic resonance data is consistent with the assigned structure, showing a $CH_3O$ grouping at 130.5 cycles on the high field side of benzene.

Example 32

A solution of 80 mg. of 17α-methoxy-19-nor-4,6-pregnadiene-3,20-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane give 7α-acetylthio - 17α - methoxy-19-nor-4-pregnene-3,20-dione.

Example 33

To a solution of 7α-acetylthio-17α-methoxy-19-nor-4-pregnene-3,20-dione (160 mg.) in a mixture of tetrahydrofuran (1.2 cc.) and methanol (0.7 cc.) is added iodine (240 mg.) and finely powdered calcium oxide (240 mg.). After stirring at room temperature for 3 hours, at which time the iodine color is discharged, the mixture is poured onto cold water (25 cc.) containing acetic acid (1.0 cc.). The product is then extracted with methylene dichloride. The extract is washed with water, dried with sodium sulfate and evaporated to dryness, to give the 21-iodo derivative. The latter compound, dissolved in moist acetonitrile, is treated with a slight excess of a 50% aqueous solution of silver fluoride at 30 to 40° C. for about 16 hours. A precipitate of silver iodide separates, leaving 7α-acetylthio - 17α-methoxy-21-fluoro-19-nor-4-pregnene-3,20-dione in solution. After filtration from the silver iodide, the reaction mixture is diluted with water and extracted with chloroform. The chloroform extract is evaporated and the residue chromatographed over acid-washed alumina. Elution with mixtures of ether and chloroform separates 7α-acetylthio-17α-methoxy-21-fluoro-19-nor-4-pregnene-3,20-dione.

Example 34

A solution of 400 mg. of 7α-acetylthio-9α-fluoro-17α-methoxy-4-pregnene-11β-ol-3,20-dione in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 7α-acetylthio-9α-fluoro-17α-methoxy, 4-pregnene-3,11,20-trione.

In accordance with the above procedure, but using 7α-acetylthio-9α-fluoro-17α-methoxy-1,4-pregnadiene-11β-ol-3,20-dione, 2α-methyl-7α-acetylthio-9α-fluoro-17α-methoxy-4-pregnene-11β-ol-3,20-dione or 2-methyl-7α-acetylthio - 9α-fluoro-17α-methoxy-1,4-pregnadiene-11β-ol-3,20-dione in place of 7α-acetylthio-9α-fluoro-17α-methoxy-4-pregnene-11β-ol-3,20-dione there is obtained the corresponding 7α-acetylthio-9α-fluoro-17α-methoxy-1,4-pregnadiene-3,11,20-trione, 2α-methyl-7α-acetylthio-9α-fluoro-17α-methoxy-4-pregnene-3,11,20-trione or 2-methyl-7α-acetylthio-9α-fluoro-17α-methoxy-1,4-pregnadiene-3,11,20-trione, respectively.

Example 35

A suspension of 9α-fluoro-17α-ethoxy-4-pregnene-3,11,20-trione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 9α-fluoro-17α-ethoxy-4,6-pregnadiene-3,11,20-trione.

The 9α-fluoro-17α-ethoxy-4-pregnene-3,11,20-trione used as the starting material can be prepared as follows:

Approximately 100 mg. of 9α-fluoro-17α-hydroxy-4-pregnene-3,11,20-trione is mixed with 5 ml. of ethyl iodide, 5 ml. of N,N'-dimethylformamide and 300 mg. of silver oxide prepared for example, by precipitation of a warm aqueous solution of silver nitrate with somewhat less than one mole of an aqueous solution of pure sodium hydroxide. The reaction mixture is stirred at 25° C. for approximately 72 hours. The inorganic precipitate comprising silver iodide which is formed during the course of the reaction is removed by filtration and the precipitate washed with chloroform to recover any occluded steroid reaction product. The filtrate and washings are combined and evaporated under reduced pressure to give a residue comprising 9α-fluoro-17-ethoxy-4-pregnene-3,11,20-trione. The crude product is purified by chromatography on acid-washed alumina and recrystallization from methylene chloride and ether to give 9α-fluoro-17α-ethoxy-4-pregnene-3,11,20-trione.

The same product is obtained in similar manner by substituting ethyl bromide in place of ethyl iodide in the above reaction.

*Example 36*

A solution of 80 mg. of 9α-fluoro-17α-ethoxy-4,6-pregnadiene-3,11,20-trione in 1.0 ml. of thioactic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 9α-fluoro-17α-ethoxy-7α-acetylthio-4-pregnene-3,11,20-trione.

*Example 37*

A suspension of 9α-chloro-17α-propoxy-4-pregnene-3,11,20-trione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed successively with 10% aqueous sodium bisulfite solution, 5% potassium hydroxide, and then water. The solution is dried over sodium sulfate and concentrated under reduced pressure to give 9α-chloro-17α-propoxy-4,6-pregnadiene-3,11,20-trione.

The 9α-chloro-17α-propoxy-4-pregnene-3,11,20-trione used as the starting material can be prepared as follows:

To 300 mg. of 9α-chloro-17α-hydroxy-4-pregnene-3,11,20-trione in 15 ml. of propyl iodide is added 900 mg. of silver oxide prepared for example by precipitation of a warm aqueous solution of silver nitrate with somewhat less than one mole of an aqueous solution of sodium hydroxide. The reaction mixture is stirred under reflux for 72 hours. The formed inorganic precipitate comprising silver iodide is removed by filtration and the precipitate washed with chloroform to recover any occluded steroid. The filtrate and washings containing the product are combined and evaporated under reduced pressure to give a crude residue comprising 9α-chloro-17α-propoxy-4-pregnene-3,11,20-trione which is purified by chromatography on acid-washed alumina and recrystallization from methylene chloride and ether to give 9α-chloro-17α-propoxy-4-pregnene-3,11,20-trione.

*Example 38*

A solution of 80 mg. of 9α-chloro-17α-propoxy-4,6-pregnadiene-3,11,20-trione in 1.0 ml. of thioacetic acid is heated under reflux on a steam bath for a period of ½ hour. Excess thioacetic acid is evaporated in a stream of nitrogen. Trituration with ether affords crystals, which, after two recrystallizations from a mixture of acetone and hexane, gives 9α-chloro-17α-propoxy-7α-acetylthio-4-pregnene-3,11,20-trione.

Various changes and modifications may be made in the present invention, certain preferred embodiments of which are herein disclosed, without departing from the scope thereof; to the extent that these changes and modifications are within the scope of the appended claims, they are to be considered a part of this invention.

I claim:

1. A compound of the formula:

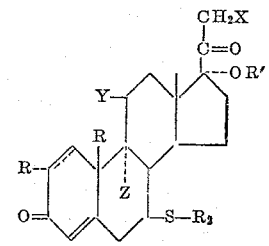

wherein the dotted lines between carbon atoms 1 and 2 indicate that a double bond may be present in this position, and where R is selected from the group consisting of hydrogen and methyl, R' stands for a lower alkyl radical, X is selected from the group consisting of hydrogen and halogen, Y is selected from the group consisting of hydrogen, keto and hydroxy, R₂ is an alkanoyl group having from 1 to 8 carbon atoms and Z is selected from the group consisting of hydrogen and halogen.

2. 7α-acetylthio-17α-methoxy-4-pregnene-3,20-dione.
3. 7α-acetylthio-17α-methoxy-1,4-pregnadiene-3,20-dione.
4. 7α-propionylthio-17α-methoxy-4-pregnene-3,20-dione.
5. 9α-fluoro-17α-ethoxy-7α-acetylthio-4-pregnene-3,11,20-trione.
6. 7α-acetylthio-9α-fluoro-17α-methoxy-4-pregnene-11β-ol-3,20-dione.
7. 7α-acetylthio-9α-fluoro-17α-methoxy-1,4-pregnadiene-11β-ol-3,11,20-trione.
8. 7α-acetylthio-17α-methoxy-21-fluoro-4-pregnene-3,20-dione.
9. 7α-acetylthio-17α-methoxy-21-fluoro-1,4-pregnadiene-3,20-dione.
10. 2α-methyl-7α-acetylthio-17α-methoxy-4-pregnene-3,20-dione.
11. 2-methyl-7α-acetylthio-17α-methoxy-1,4-pregnadiene-3,20-dione.
12. 2α-methyl-7α-acetylthio-17α-methoxy-21-fluoro-4-pregnene-3,20-dione.
13. 2-methyl-7α-acetylthio-17α-methoxy-21-fluoro-1,4-pregnadiene-3,20-dione.
14. 2α-methyl-7α-acetylthio-9α-fluoro-17α-methoxy-4-pregnene-11β-ol-3,20-dione.
15. 2-methyl-7α-acetylthio-9α-fluoro-17α-methoxy-1,4-pregnadiene-11β-ol-3,20-dione.
16. 2α-methyl-7α-acetylthio-9α,21-difluoro-17α-methoxy-4-pregnene-11β-ol-3,20-dione.
17. 2-methyl-7α-acetylthio-9α,21-difluoro-17α-methoxy-1,4-pregnadiene-11β-ol-3,20-dione.
18. 7α-lower alkanoylthio-17α-lower alkoxy-4-pregnene-3,11,20-triones.

References Cited in the file of this patent

UNITED STATES PATENTS

| | | |
|---|---|---|
| 2,837,543 | Dodson et al. | June 3, 1958 |
| 2,874,154 | Stork et al. | Feb. 17, 1959 |
| 2,894,008 | Sollman | July 7, 1959 |
| 2,904,560 | Dodson et al. | Sept. 15, 1959 |

OTHER REFERENCES

Ringold et al.: J. Org. Chem. 21, 239–40 (1956).
Dodson et al.: J.A.C.S. 81, 1224–1227 (1959).
Agnello et al.: J.A.C.S. 81, 1224–1227 (1959).